(12) United States Patent
Ohara

(10) Patent No.: US 7,391,543 B2
(45) Date of Patent: Jun. 24, 2008

(54) IMAGE READING APPARATUS

(75) Inventor: Toshimitsu Ohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 450 days.

(21) Appl. No.: 11/189,398

(22) Filed: Jul. 25, 2005

(65) Prior Publication Data
US 2006/0044625 A1 Mar. 2, 2006

(30) Foreign Application Priority Data
Jul. 23, 2004 (JP) ............ P2004-215928

(51) Int. Cl.
H04N 1/04 (2006.01)
(52) U.S. Cl. ............ 358/483; 358/482; 358/497; 358/474; 358/475; 358/506; 358/505; 358/514
(58) Field of Classification Search .......... 358/483, 358/482, 512–514, 484, 475, 509, 474, 505, 358/487, 506; 250/208.1, 234–236, 216, 250/239; 355/40, 41; 399/211; 382/312, 382/318, 319
See application file for complete search history.

(56) References Cited
U.S. PATENT DOCUMENTS
6,762,864 B2   7/2004   Kao
6,940,063 B2   9/2005   Spears et al.
2005/0219658 A1*  10/2005  Miyahara .......... 358/509
2006/0061835 A1*   3/2006  Inada ............... 358/474

FOREIGN PATENT DOCUMENTS
JP   2001-133906   5/2001
JP   2003-37712    2/2003
JP   2003-37713    2/2003
JP   2004-126284   4/2004

* cited by examiner

Primary Examiner—Cheukfan Lee
(74) Attorney, Agent, or Firm—John J. Penny, Jr.; Edwards Angell Palmer & Dodge LLP

(57) ABSTRACT

A document platen. A support member supports an end portion of the document platen from below in a sub scanning direction. A sensor module has a first protruding portion protruding in the sub scanning direction. The sensor module includes a first sensor, and a second sensor being shorter than the first sensor in length and being housed into the first protruding portion. A transport unit transports the sensor module in the sub scanning direction. When the sensor module is transported to an end part in the sub scanning direction, the support member is housed into a space disposed at a side of the first protruding portion in a main scanning direction.

11 Claims, 15 Drawing Sheets

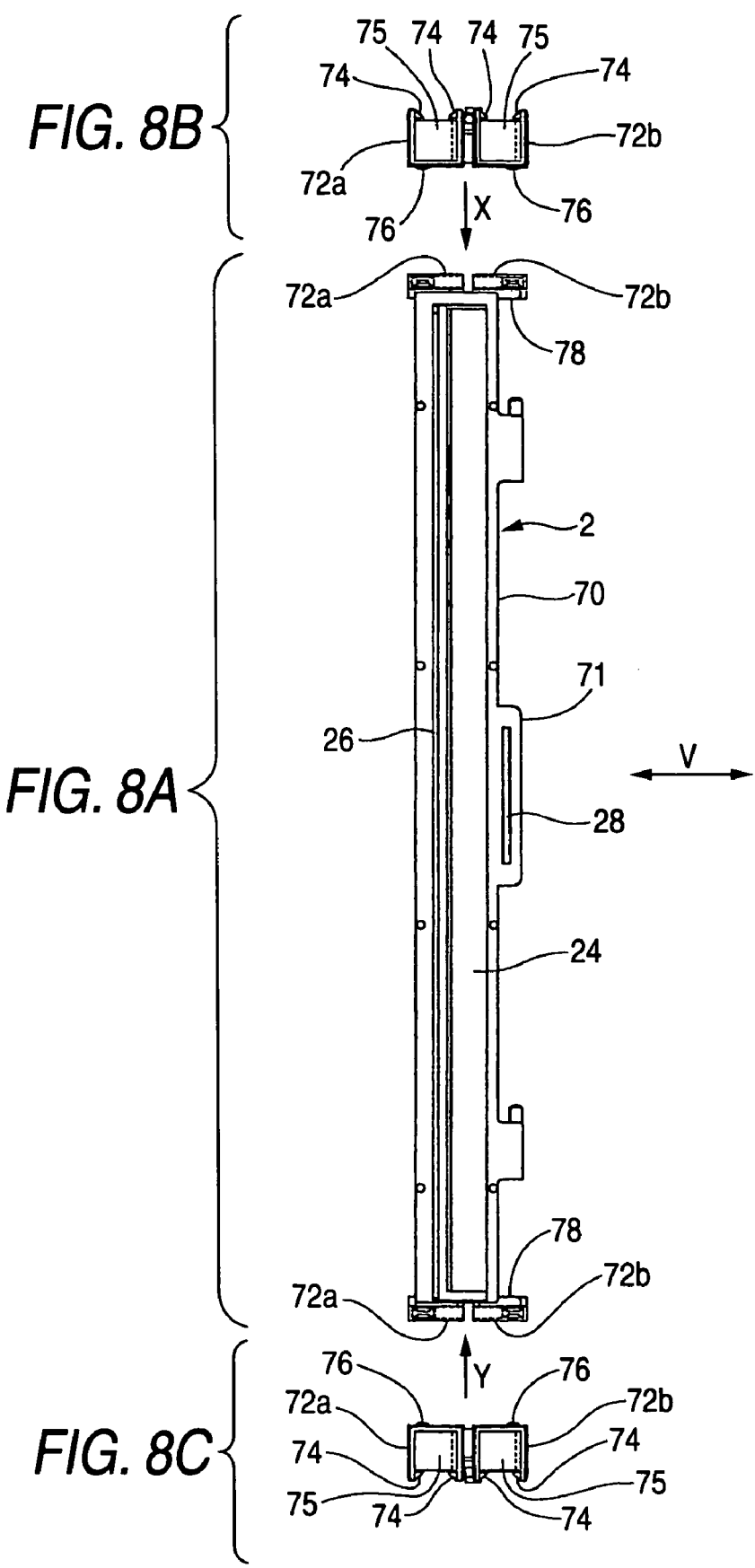

IMAGE READING APPARATUS

BACKGROUND OF THE INVENTION

The present invention relates to an image reading apparatus.

An image reading apparatus (see JP-A-2001-133906) mounted with a contact image sensor module has heretofore been known. Since an optical system of the contact image sensor module has a short optical path, it is easy to reduce the size of the image reading apparatus.

However, since the contact image sensor module has a shallow depth field, the image reading apparatus cannot clearly read a document placed at a position away from a platen surface of a document platen. For example, an image reading apparatus described in JP-A-2001-133906 cannot clearly read a 35 mm film or the like held by a holder.

Image reading apparatuses described in JP-A-2003-37712 and JP-A-2003-37713, each including a plurality of optical systems, can clearly read a reflective document and a transmissive document by changing an optical path in response to the document. However, the image reading apparatuses described in JP-A-2003-37712 and JP-A-2003-37713, the optical systems of which have a complex configuration and a long optical path, have the problem in which they are high in manufacturing cost and unfit for a reduction in size.

A first linear image sensor and a second linear image sensor are disposed to provide a configuration such that an optical image of a document placed on the platen surface of the document platen is focused onto the first linear image sensor, and such that an optical image of a document placed at a position away from the platen surface of the document platen is focused onto the second linear image sensor. Such a configuration makes it possible to clearly read the document placed on the platen surface of the document platen and the document placed at a position away from the platen surface of the document platen.

When provided with the two linear image sensors parallel to each other, the contact image sensor module is increased in size in a sub scanning direction. As the contact image sensor module is increased in size in the sub scanning direction, when a support supports an end portion of the document platen in the sub scanning direction, it follows that the support must be displaced in the sub scanning direction so as not to hinder when the contact image sensor module has been transported to an end. However, when the support is displaced in the sub scanning direction, the document platen must be extended in the sub scanning direction by an amount equivalent to the displacement, which raises the problem of an increase in size of the document platen.

SUMMARY

An object of the invention is to provide an image reading apparatus capable of mounting two linear image sensors on a contact image sensor module without increasing the size of a document platen.

To achieve the aforesaid object, according to the invention, there is provided an image reading apparatus comprising:

a document platen;

a support member supporting an end portion of the document platen from below in a sub scanning direction;

a sensor module having a first protruding portion protruding in the sub scanning direction, the sensor module comprising:

a first sensor; and a second sensor being shorter than the first sensor in length and being housed into the first protruding portion; and a transport unit transporting the sensor module in the sub scanning direction, wherein when the sensor module is transported to an end part in the sub scanning direction, the support member is housed into a space disposed at a side of the first protruding portion in a main scanning direction.

According to this configuration, since the second sensor is shorter in length than the first sensor, the first protruding portion protruding in the sub scanning direction is provided, and the second sensor is housed into the first protruding portion, thereby securing a space on a side of the second sensor in the main scanning direction. The space of the second sensor in the main scanning direction, in other words, is the space that is present on the side of the first protruding portion in the main scanning direction. When the sensor module is transported to the sub scanning-direction end, the support member is housed into the space that is present on the side of the first protruding portion in the main scanning direction, without abutting the first protruding portion. Accordingly, the support member need not be displaced in the sub scanning direction although the sensor module is increased in size in the sub scanning direction as the sensor module is provided with the two sensors. Therefore, according to this image reading apparatus, two sensors can be mounted on the sensor module without increasing the size of the document platen.

Preferably, a first pixel size of the first sensor is different from a second pixel size of the second sensor.

According to this configuration, the pitch of pixels of the sensor whose pixel size is smaller is reduced, thereby making it possible to generate image data having a resolution that differs between the first and second sensors.

Preferably, the image reading apparatus further comprises: a first lens focusing onto the first sensor an optical image of the document supported by the document platen on a platen surface of the document platen; and a second lens focusing onto the second sensor the optical image of the document that is supported by the document platen at a position away from the platen surface.

According to this configuration, it is possible to read the document supported on the platen surface of the document platen and the document supported at the position away from the platen surface.

Preferably, the image reading apparatus further comprises an adjustment member that adjusts inclination of the sensor module to the document platen.

According to this configuration, for example, when a clear image is focused onto the first sensor and a blurred image is focused onto the second sensor due to an error, the inclination is adjusted, whereby an adjustment can be made so that a clear image is focused even onto the second sensor.

Preferably, the image reading apparatus further comprises an urging member urging the sensor module toward the document platen, and the adjustment member includes a spacer replaceably disposed between the sensor module and the document platen.

According to this configuration, the inclination of the sensor module to the document platen can be adjusted by changing the thickness of the spacer at one and the other end portions in a sub scanning direction. Besides, for example, when a blurred image is focused both onto the first sensor and onto the second sensor due to an error, the spacer is replaced with a spacer having a proper thickness both at one and the other end portions, whereby an adjustment can be made so that a clear image is focused both onto the first and second sensors.

Preferably, the spacer has two projections spaced from each other in a sub scanning direction, the projections project toward the document platen.

According to this configuration, the sub scanning-direction thickness of the spacer can be changed at one end and the other end portions by changing the height of each projection.

Preferably, the spacer is divided into a first spacer having one of the projections and a second spacer having the other projection.

Preferably, one of the projections is positioned on a centerline of the first lens in a main scanning direction.

Besides, preferably, the other projection is positioned on a centerline of the second lens in the main scanning direction.

According to this configuration, the projections are adapted to be positioned on the centerlines of the lenses, whereby the height of the projections are made equal to the distance between the lenses and the document platen, so that it becomes easy to adjust the distance between the lenses and the document platen as intended.

Preferably, the one of the projections is provided at a center of the first spacer in the sub scanning direction, and the other projection is provided at a center of the second spacer in the sub scanning direction.

According to this configuration, the projections are provided at the centers of the respective spacers, whereby the first and second spacers can be used in common.

Preferably, the sensor module has a second protruding portion protruding in the sub scanning direction, and one of the projections is attached to the second protruding portion, and when the sensor module is transported to an end part in the sub scanning direction, the support member is housed into a space that is present on a side of the second protruding portion in the main scanning direction.

According to this configuration, the support member need not be displaced in the sub scanning direction although the second protruding portion protruding in the sub scanning direction is provided in order that the inclination of the sensor module can be more finely adjusted. This can avoid an increase in size of the document platen in the sub scanning direction.

BRIEF DESCRIPTION OF THE DRAWINGS

FIG. 8A shows a top view of the contact image sensor module according to the first embodiment of the invention, and FIGS. 8B and 8C show side views thereof.

DETAILED DESCRIPTION OF THE INVENTION

The mode for carrying out the invention will hereinafter be described in accordance with a plurality of embodiments.

First Embodiment

FIGS. 2 to 4B are schematic views of an image scanner 1 serving as an image reading apparatus of a first embodiment of the invention. The image scanner 1 is a so-called flat-bed type image scanner. The image scanner 1 can read a reflective document 4 (see FIG. 4A) of up to A4 size and A4/letter size and a transmissive document. The reflective document 4 is a printed document, a photograph, or the like. The transmissive document is a 35 mm film (negative/positive) 6 (see FIG. 4B) or the like. In the following description, the 35 mm film is used as the transmissive document. Additionally, the image reading apparatus may be a sheet-feed type image scanner and may also be a complex machine. Besides, the transmissive document is not limited to the 35 mm film.

Figure 3:
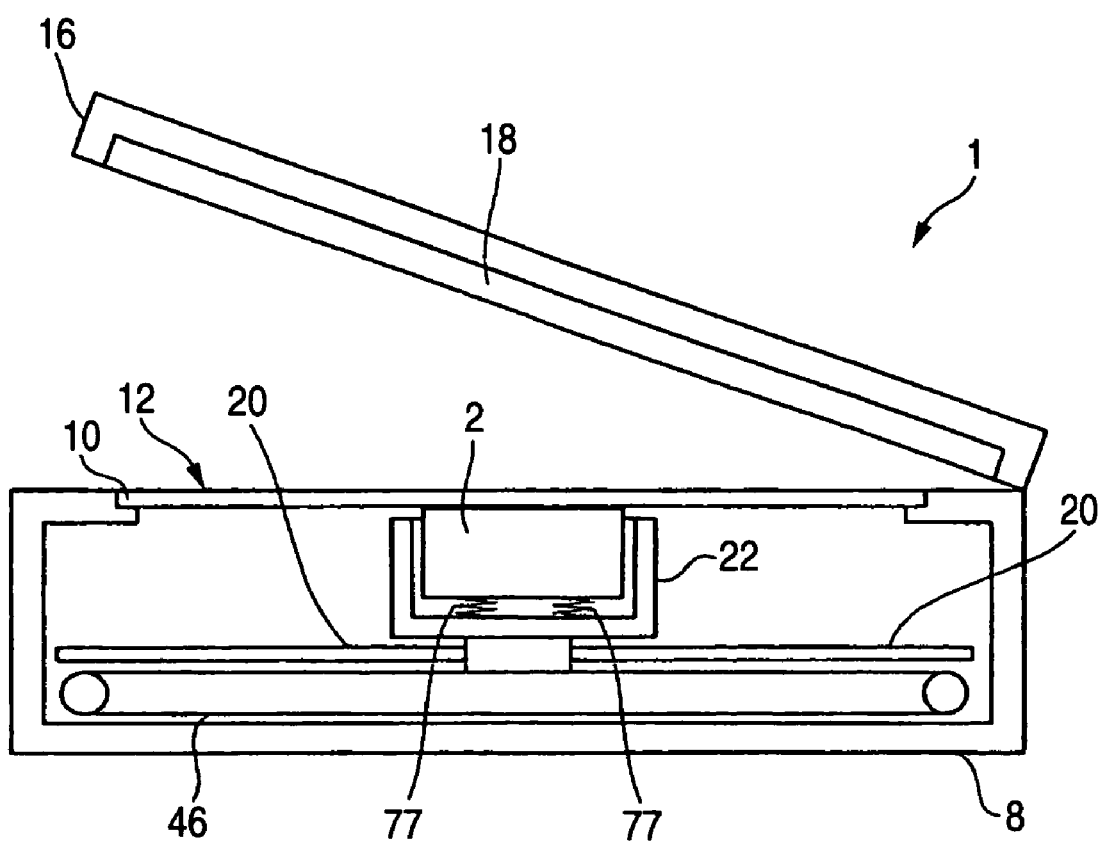
FIG. 3 shows a schematic view of the image reading apparatus according to the first embodiment of the invention.

A housing 8 shown in FIG. 3 is formed into an open-topped box shape. A document platen 10, formed of a substantially rectangular transparent plate such as a glass plate, closes an opening of the housing 8. The reflective document 4 or the 35 mm film 6 held by a holder 14 (see FIG. 4B) are placed on a platen surface 12 of the document platen 10. The 35 mm film 6 held by the holder 14 is held at a position 1 mm above the platen surface 12 of the document platen 10.

A transmissive document light source 18 is disposed on the document platen 10 side of a document cover 16. The transmissive document light source 18 includes a not-shown fluorescent tube lamp, reflector, diffuser, and the like. The fluorescent tube lamp is disposed so that its longitudinal axis extends parallel to the longitudinal axis of a guide rod 20. The reflector is disposed on the side of the fluorescent tube lamp opposite the document platen 10. The diffuser is disposed on the same side of the fluorescent tube lamp as the document platen 10. Light emitted from the fluorescent tube lamp is reflected off the reflector and is then diffused by the diffuser to illuminate a 35 mm film 6 read region A1 (see FIG. 2) at a uniform illuminance. Additionally, the fluorescent tube lamp may be an LED (light emitting diode). Besides, the transmissive document light source 18 may be a light guide light source using a collector such as adopted by a notebook PC or the like.

A contact image sensor module 2 is mounted on a carriage 22.

Figure 5A:
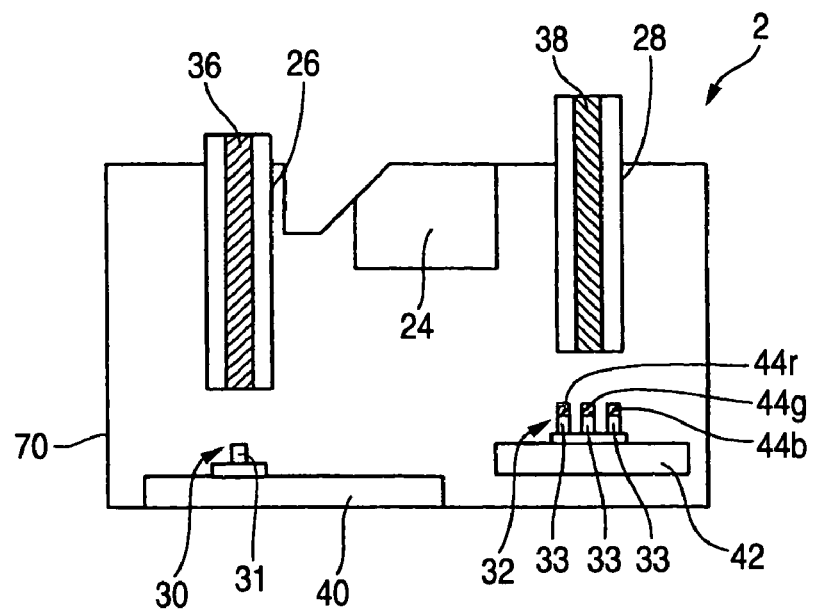
FIGS. 5A and 5B show schematic views of the contact image sensor module according to the first embodiment of the invention.
Figure 5B:
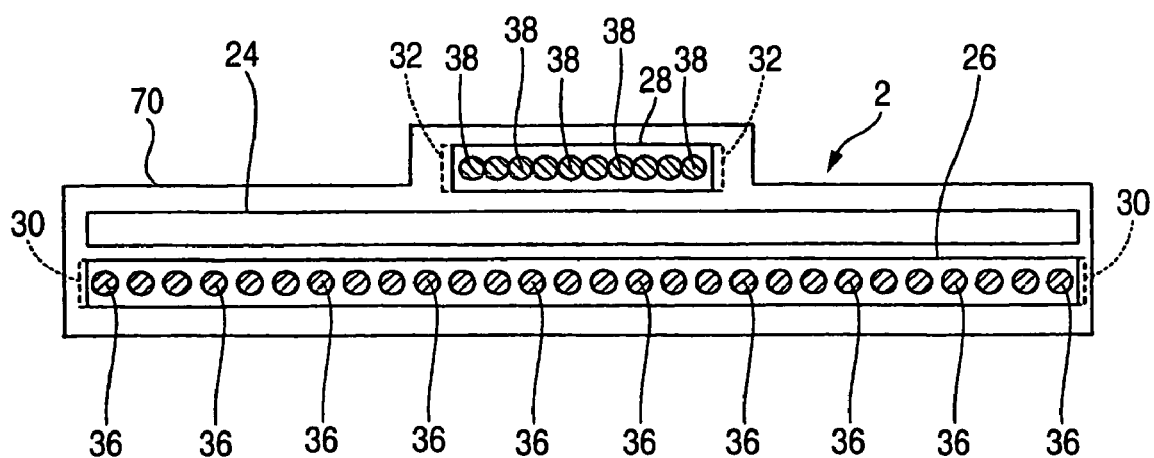

FIGS. 5A and 5B are schematic views representing the contact image sensor module 2. The contact image sensor module 2 includes a reflective document light source 24, a first rod lens array 26, a second rod lens array 28, a first linear image sensor 30, a second linear image sensor 32, an elongated box-like casing 70 for housing them, and the like. In the case of installing the reflective document light source 24 onto the contact image sensor module 2, when the reflective document light source 24 is disposed between the first and second linear image sensors 30 and 32, the distance between the first and second linear image sensors 30 and 32 is increased as compared with, for example, when the reflective document light source 24, first linear image sensor 30, and second linear image sensor 32 are disposed in the order named. When the distance therebetween is large, a slight inclination of the contact image sensor module 2 causes the first linear image sensor 30 or the second linear image sensor 32 to move greatly in a direction perpendicular to the document platen 10. Therefore, an adjustment can be made so that a clear image is focused both onto the first linear image sensor 30 and the second linear image sensor 32, without greatly inclining the contact image sensor module 2. As shown in FIG. 5B, these components of the contact image sensor module 2 are disposed with their longitudinal centers aligned with each other. The longitudinal width of the first linear image sensor 30 is different from that of the second linear image sensor 32. Specifically, the longitudinal width of the arrangement range of light receiving elements 31 arranged in the first linear image sensor 30 is 218 mm capable of reading the document of A4 size and A4/letter size. The longitudinal width of the arrangement range of light receiving elements 33 arranged in the second linear image sensor 32 is 27 mm capable of reading the 35 mm film. The light receiving elements 31 and the light receiving elements 33 will be described later. The longitudinal width of the reflective document light source 24 and that of the first rod lens array 26 are designed based on the longitudinal width of the arrangement range of the light receiving elements 31. The longitudinal width of the second rod lens array 28 is designed based on the longitudinal width of the arrangement range of the light receiving elements 33. Additionally, the components of the contact image sensor module 2 may be disposed in another fashion. For example, the components of the contact image sensor module 2 may be disposed with their longitudinal one end faces aligned with each other. Besides, the longitudinal width of the first linear image sensor 30 and that of the second linear image sensor 32 can be determined in accordance with the width of the documents, and are not limited to 218 mm and 27 mm, respectively.

Figure 4A:
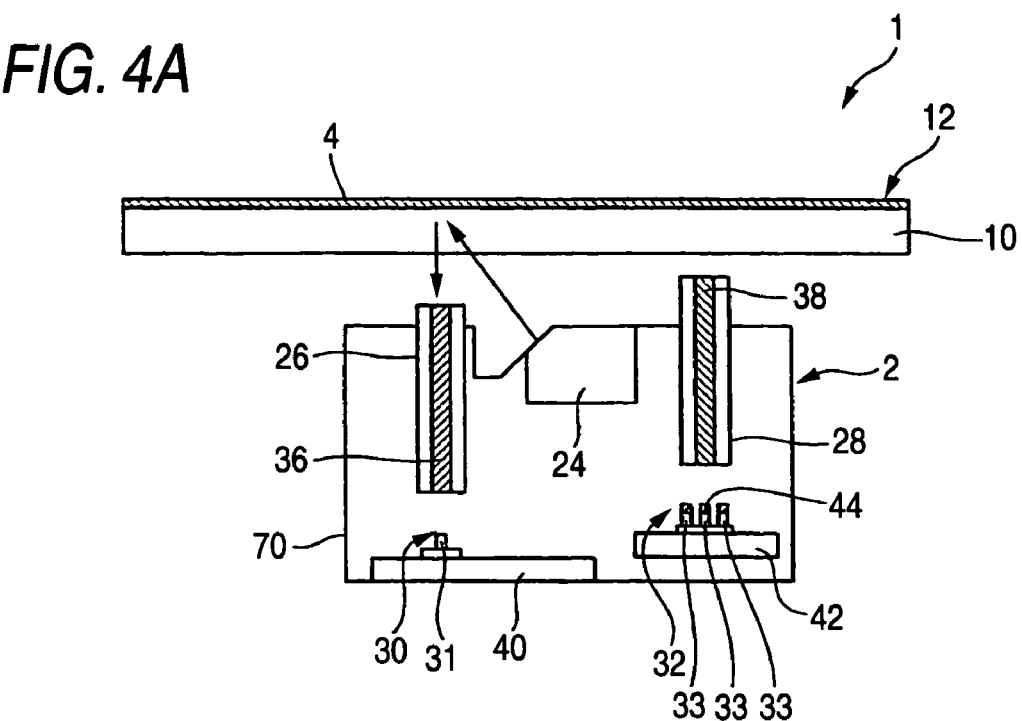
FIGS. 4A and 4B show schematic views of the image reading apparatus according to the first embodiment of the invention.
Figure 4B:
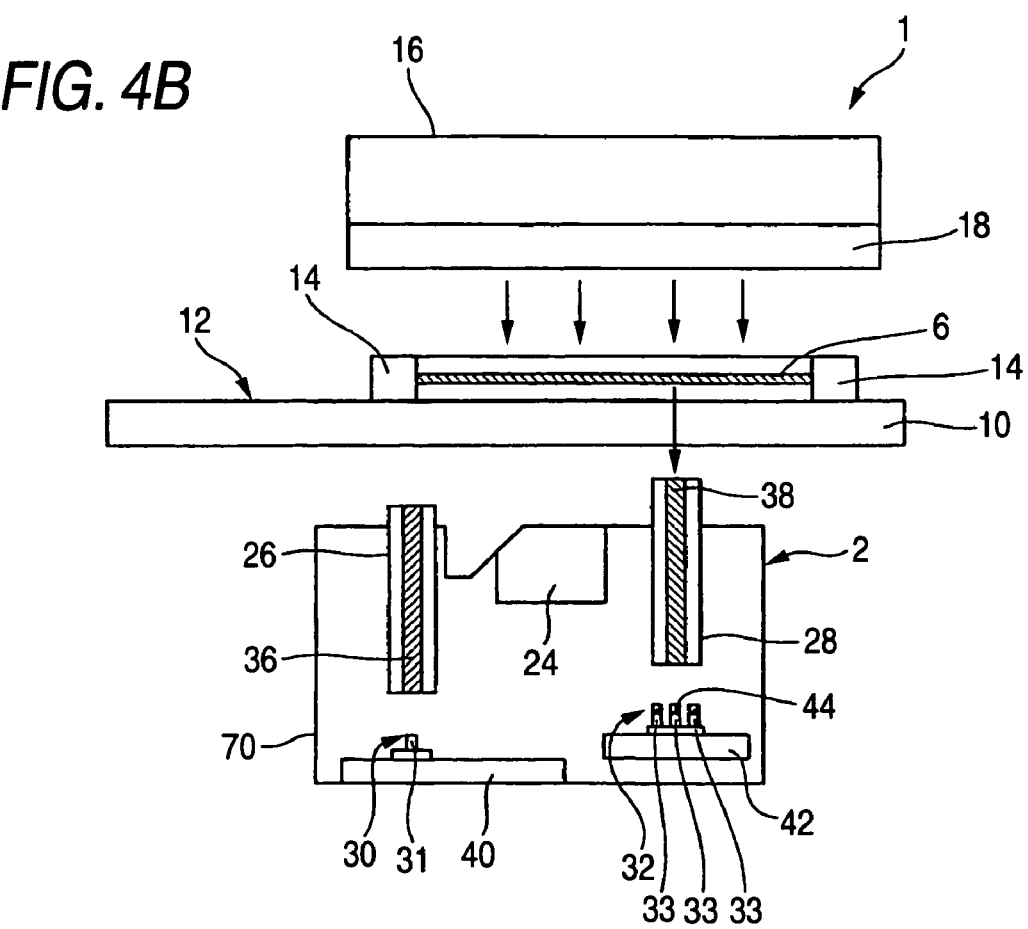

As shown in FIG. 4A, the reflective document light source 24, first rod lens array 26, and first linear image sensor 30 are used for the process of reading the reflective document 4. As shown in FIG. 4B, the second rod lens array 28 and second linear image sensor 32 are used for the process of reading the 35 mm film 6. The resolution of the first linear image sensor 30 is different from that of the second linear image sensor 32. Specifically, the resolution of the first linear image sensor 30 is 1200 dpi capable of sufficiently reproducing image information stored on the reflective document. The resolution of the second linear image sensor 32 is 2400 dpi capable of sufficiently reproducing image information stored on the 35 mm film 6. Additionally, the resolution of the first linear image sensor 30 is not limited to 1200 dpi. Besides, the resolution of the second linear image sensor 32 is not limited to 2400 dpi.

The reflective document light source 24 includes an LED for emitting specific color light and a light guide. Specifically, for example, the reflective document light source 24 includes an LED (red LED) for emitting red light, an LED (green LED) for emitting green light, and an LED (blue LED) for emitting blue light. Light emitted from the LED is guided by the light guide member to illuminate the reflective document. The not-shown light guide member is formed of a light-transmissive member such as glass. Additionally, the reflective document light source 24 may be a fluorescent tube lamp or the like.

The first rod lens array 26 has a plurality of linearly arranged cylindrical lenses (rod lenses) 36. An optical image is formed on a scanning line by light that is emitted from the reflective document light source 24 and then reflected off the reflective document 4. The first rod lens array 26 focuses the optical image at the same magnification onto the light receiving surfaces of the light receiving elements 31 arranged in the first linear image sensor 30.

The first linear image sensor 30 is mounted on a printed circuit board 40. The first linear image sensor 30 includes a plurality of the light receiving elements 31 arranged in a straight row, a MOS transistor switch, and the like. The first linear image sensor 30 scans the optical image of the reflective document 4 which is focused by the first rod lens array 26, and outputs an electric signal correlate with the contrasting density of the aforesaid optical image. The optical image of the reflective document 4 is thereby converted into an image signal.

The focal length of the first rod lens array 26 and the distance between the first rod lens array 26 and the first linear image sensor 30 are designed such that the position (focal position) of the document, whose optical image is clearly focused onto the light receiving surface of the first linear image sensor 30 by the first rod lens array 26, falls on the platen surface 12 of the document platen 10. Therefore, the image scanner 1, if there is no error, can clearly read the reflective document 4 placed on the platen surface 12 of the document platen 10.

The second rod lens array 28, having the same configuration as the first rod lens array 26, has second rod lenses 38. The focal length of the second rod lens array 28 is equal to that of the first rod lens array 26. An optical image is formed on a scan line by light that is emitted from the transmissive document light source 18 and then transmitted through the 35 mm film 6. The second rod lens array 28 focuses the optical image at the same magnification onto the light receiving surfaces of the light receiving elements 33 arranged in the second linear image sensor 32.

The second linear image sensor 32 includes a plurality of the light receiving elements 33 arranged, in three rows, parallel to the light receiving elements 31 of the first linear image sensor 30, a MOS transistor switch, and the like. Color filters of colors different with each of the three rows are disposed in the second linear image sensor 32. Specifically, for example, the color filters are, as shown in FIG. 5A, a filter (red filter) 44r that transmits red light, a filter (green filter) 44g that transmits green light, and a filter (blue filter) 44b that transmits blue light. White light emitted from the transmissive document light source 18 can thereby be color-separated into red light, green light, and blue light. The second linear image sensor 32 scans the optical image of the 35 mm film which is focused by the second rod lens array 28, and thereby outputs an electric signal correlate with the contrasting density of the aforesaid optical image. The optical image of the 35 mm film is thereby converted into an image signal. Additionally, the color filters have been described as being disposed in the second linear image sensor 32 (as on-chip color filters), but may be disposed in a component different from the second linear image sensor 32. The light receiving elements 33 of the second linear image sensor 32 are smaller in size (pixel size) than the light receiving elements 31 of the first linear image sensor 30. In the second linear image sensor 32, the pitch of the light receiving elements 33 is reduced by an amount equivalent to the decrease in pixel size. Consequently, when the second linear image sensor 32 is used, higher-resolution image data can be generated than when the first linear image sensor 30 is used.

The second rod lens array 28 is fixed to a position, within the casing 70, 1 mm closer to the platen surface 12 of the document platen 10 than the first rod lens array 26. The second linear image sensor 32 is mounted on a printed circuit board 42 fixed at a position 1 mm closer to the platen surface 12 of the document platen 10 than the printed circuit board 40. Therefore, the light receiving surfaces of the light receiving elements 33 are 1 mm closer to the platen surface 12 of the document platen 10 than those of the light receiving elements 31. Since the second rod lens array 28 and the light receiving surfaces of the light receiving elements 33 are disposed 1 mm closer to the platen surface 12 of the document platen 10, the focal position of the document involving the second rod lens array 28 and the second linear image sensor 32, falls on a position 1 mm above the platen surface 12 of the document platen 10. That is, the image scanner 1, if there is no error, can clearly read the 35 mm film 6 that is held by the holder 14 at a position 1 mm above the platen surface 12 of the document platen 10. Additionally, the distance between the platen surface 12 of the document platen 10 and the focal position need only be determined in accordance with the position at which the document is held, but is not limited to 1 mm. Furthermore, the first and second rod lens arrays 26 and 28 are made different in conjugate length, whereby the difference in position between the first and second rod lens arrays 26 and 28 and the difference in focal position therebetween are adapted not to match each other.

Figure 6:
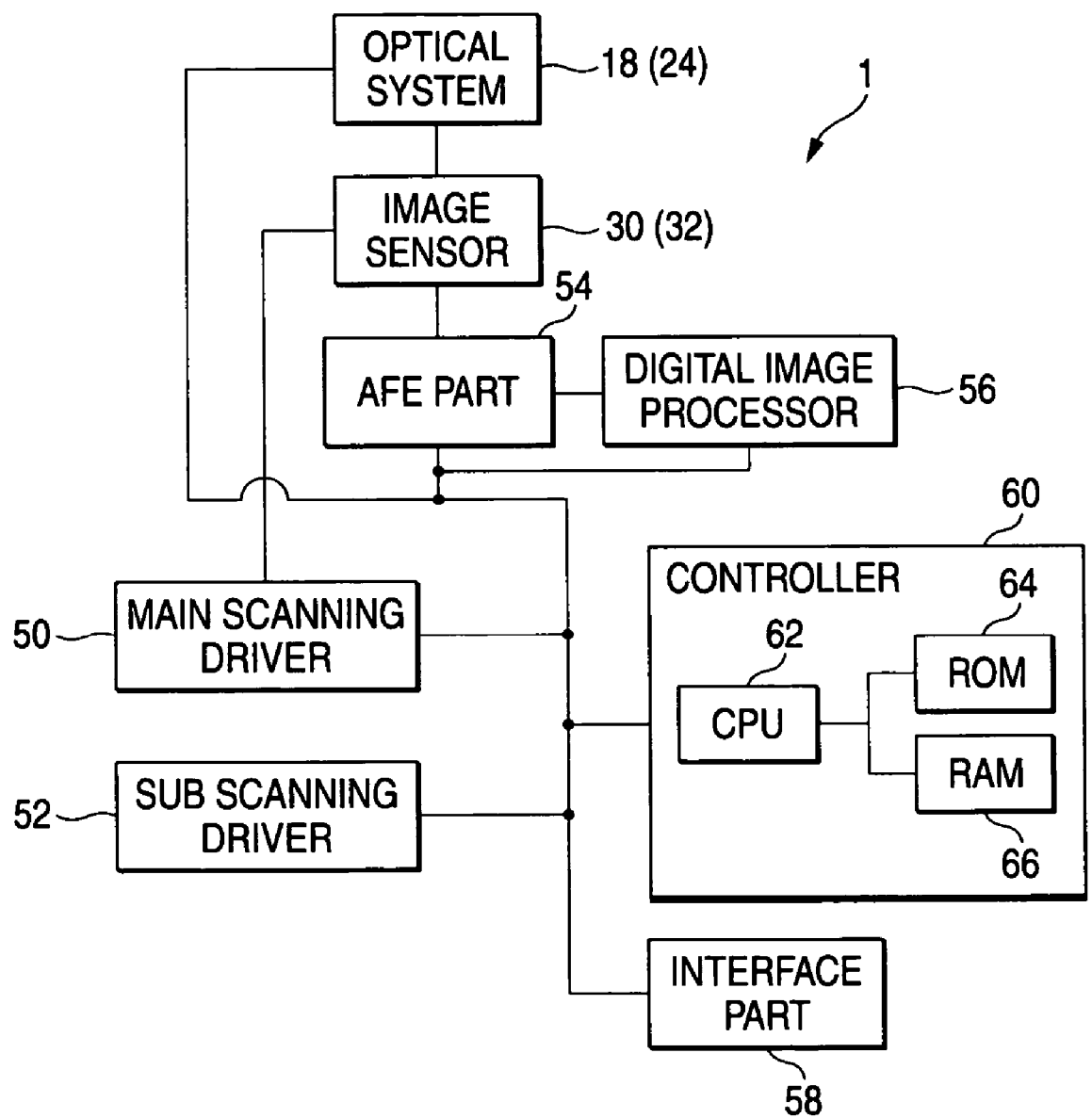
FIG. 6 shows a block diagram of the image reading apparatus according to the first embodiment of the invention.

FIG. 6 is a block diagram representing the hardware configuration of the image scanner 1.

A main scanning driver 50 is a drive circuit that outputs drive pulses necessary to drive the first and second linear image sensors 30 and 32 to the first and second linear image sensors 30 and 32. The main scanning driver 50 includes, for example, a synchronizing signal generator and a drive timing generator.

A sub scanning driver 52 includes the guide rod 20 that slidably holds the carriage 22 as shown in FIG. 3, a not-shown stepping motor, a drive belt 46, a not-shown drive circuit, and the like. The stepping motor pulls the carriage 22 via the drive belt 46, thereby moving the first and second linear image sensors 30 and 32 relative to the reflective document 4 or the 35 mm film 6. This enables scanning of a 2D image.

An AFE (analog front end) part 54 includes a not-shown analog signal processor, A/D converter, and the like. The analog signal processor subjects electric signals outputted from the first and second linear image sensors 30 and 32 to amplification and analog signal processing such as noise reduction processing, and then outputs the electric signals. The A/D converter quantizes the electric signals outputted from the analog signal processor into output signals digitally represented by a predetermined bit length, and then outputs the output signals.

A digital image processor 56 subjects the output signals outputted from the AFE part 54 to image processing, such as gamma correction, interpolation of defect pixels by pixel interpolation, shading correction, sharpening of image signals, and color space conversion.

An interface part 58 is configured in conformity with communications standards such as RS-232C, Bluetooth, and USB. The image scanner 1 can be communicatably connected via the interface part 58 to a not-shown personal computer (PC).

A controller 60 includes a CPU 62, a ROM 64 and a RAM 66. The CPU 62 executes a computer program stored in the ROM 64 to control the sections of the image scanner 1. The ROM 64 is a memory storing various programs and data, and the RAM 66 is a memory that temporarily stores various programs and data.

The processes of the image scanner 1 will now be described.

In the process of reading the reflective document, the image scanner 1 lights the individual color LEDs of the reflective document light source 24 in time sharing fashion during read cycles for one line, thereby reading color image data of the reflective document for one line through three read cycles. The controller 60 lights the red, green, and blue LEDs of the reflective document light source 24 in time sharing fashion while moving the carriage 22, thus reading a color image of the reflective document.

In the process of reading the 35 mm film, the light receiving elements 33 arranged in three rows convert the optical image of the 35 mm film into an electric signal correlate with a color component responsive to the color of the color filter disposed in each row. Specifically, for example, the optical image of the 35 mm film is converted into a red-color electric signal in the first row of the light receiving elements 33, a green-color electric signal in the second row thereof, and a blue-color electric signal in the third row, each through one read cycle. That is, the color image data of the 35 mm film for three lines can be read through three read cycles.

The outer shape of the contact image sensor module 2 will now be described.

Figure 7:
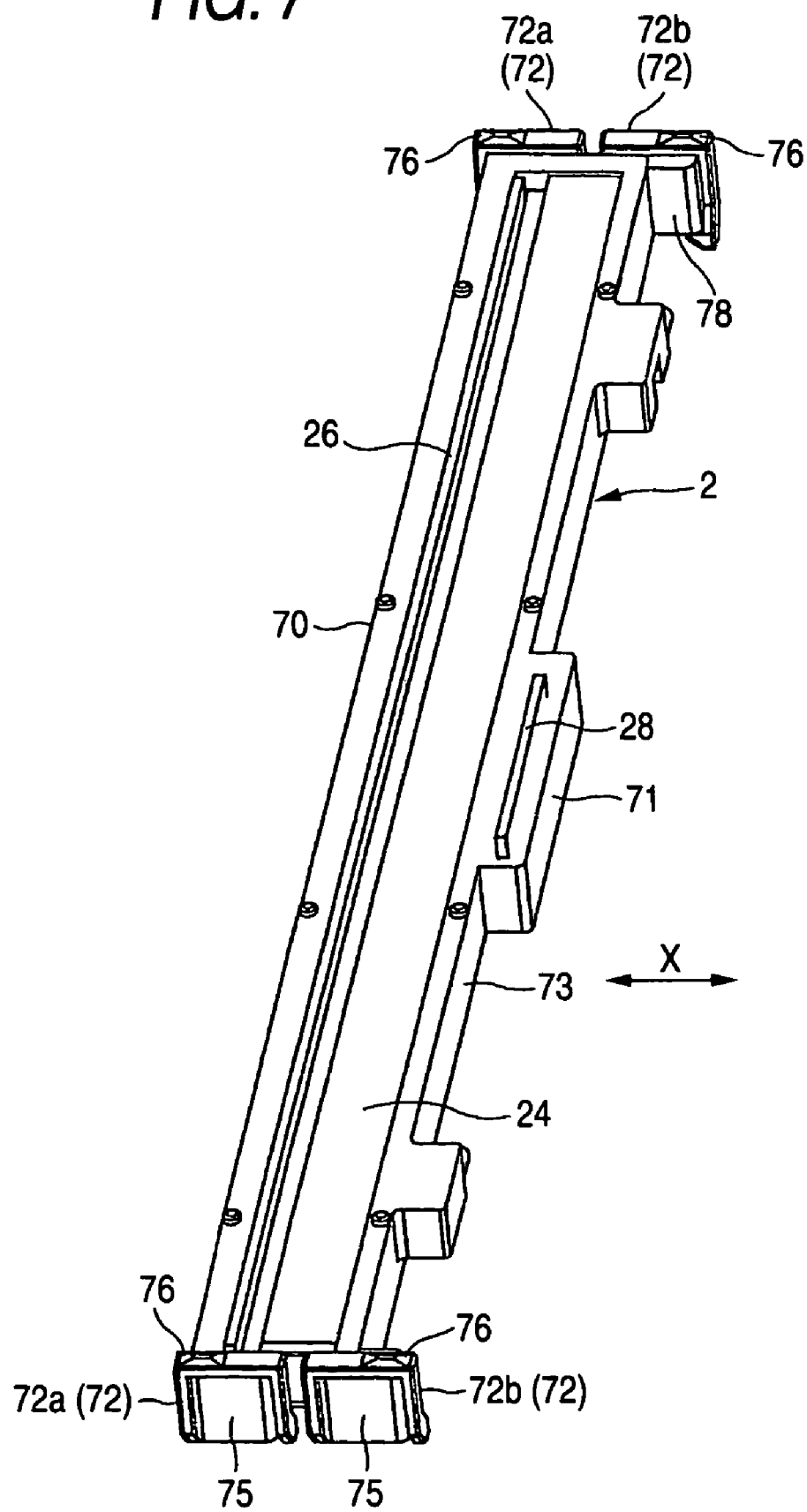
FIG. 7 shows a perspective view of a contact image sensor module according to the first embodiment of the invention.

FIG. 7 is a perspective view of the contact image sensor module 2. FIG. 8A is a top view of the contact image sensor module 2, and FIGS. 8B and 8C are side views thereof as seen from the directions X and Y, respectively, shown in FIG. 8A. As shown in FIG. 7, the contact image sensor module 2 has the elongated box-like casing 70. The casing 70 has, on the periphery of the center thereof in the longitudinal direction (main scanning direction), a first protruding portion 71 protruding in a sub scanning direction. Here, the direction X shown in FIG. 7 and the direction V shown in FIG. 8A indicate the sub scanning direction. The second linear image sensor 32 is housed in the first protruding portion 71, and the first linear image sensor 30 in a non-protuberant portion. Since the two linear image sensors are housed in the contact image sensor module 2, it is inevitable that the contact image sensor module 2 is increased in size in the sub scanning direction. However, when the second linear image sensor 32 is short in length, the increase in size can be minimized by housing it in the first protruding portion 71. A second protruding portion 78 protruding in the sub scanning direction is provided at each end of the casing 70 in the main scanning direction, and a spacer 72 is replaceably attached to each end thereof.

In the first embodiment, spacers 72 are each divided into a first spacer 72a and a second spacer 72b. The first and second spacers 72a and 72b are formed into a horseshoe shape and, as shown in FIGS. 8B and 7C, a pawl 74 is provided at each tip thereof. Two engaging portions 75 protruding, in a substantially square shape, in the axial direction of the first linear image sensor 30 are provided at each end of the casing 70, and the first and second spacers 72a and 72b are attached to the engaging portions 75 from the direction X or Y As shown in FIG. 7, one projection 76 projecting upward is provided on each of the first and second spacers 72a and 72b. The projection 76 is provided not at the sub scanning-direction center of the surface on which the projection 76 is provided, but at a position offset from the aforesaid center toward one sub scanning-direction side. The first and second spacers 72*a* and 72*b* are attached so that their projections 76 are spaced farther away from each other. The sub scanning-direction thickness of each spacer 72 can be changed at one and the other end portions by changing the height of each projection 76. As shown in the figures, the second spacers 72*b* are attached to the second protruding portions 78, so that the projections 76 are positioned just above the second protruding portions 78. When the second protruding portions 78 are provided and the second spacers 72*b* are attached so that the projections 76 are thus positioned just above the second protruding portions 78, the two projections 76 of each spacer 72 can be attached spaced so much farther away from each other in the sub scanning direction. Thus, the contact image sensor module 2 can be more finely adjusted as to its inclination. The detail will be described later.

There are prepared three kinds of first spacers 72*a* and three kinds of second spacers 72*b*. For example, in the case of the first spacers 72*a*, when the height of the projections 76 obtained when a clear optical image is focused onto the first linear image sensor 30 if no error occurs is defined as a standard, there are prepared the following three first spacers for each. That is, they are a standard first spacer 72*a*, a first spacer 72*a* having the projection 76 higher than the standard by 0.1 mm, and a first spacer 72*a* having the projection 76 lower than the standard by 0.1 mm. The same applies to the second spacers 72*b*. Additionally, how many kinds are to be prepared for each can be appropriately selected. The first and second spacers 72*a* and 72*b* may be of the same shape, and in this case, one of the divided spacers can be used both as the first and second spacers 72*a* and 72*b*. Additionally, the configuration may be such that the projections 76 are provided at the centers of the first spacers 72*a* in the sub scanning direction and at the centers of the second spacers 72*b* in the sub scanning direction, and such that these spacers 72*a* and 72*b* can thus be used in common at four places.

Urging members will now be described.

As shown in FIG. 3, the contact image sensor module 2, mounted on the carriage 22, is transported in the sub scanning direction. Springs 77, disposed between the contact image sensor module 2 and the carriage 22, urge the contact image sensor module 2 toward the document platen 10. The contact image sensor module 2 is urged by the springs 77, whereby the projections 76 abut the platen surface 12 of the document platen 10 and slide on the document platen 10 during read of the document. In FIG. 3, two springs are disposed in the sub scanning direction, but these springs are not limited in number. However, the spacers 72 can be brought into more steady contact with the glass when the springs are laid out spaced widely in the sub scanning direction.

There will now be described an adjustment as to the inclination of the contact image sensor module 2.

Figure 9A:
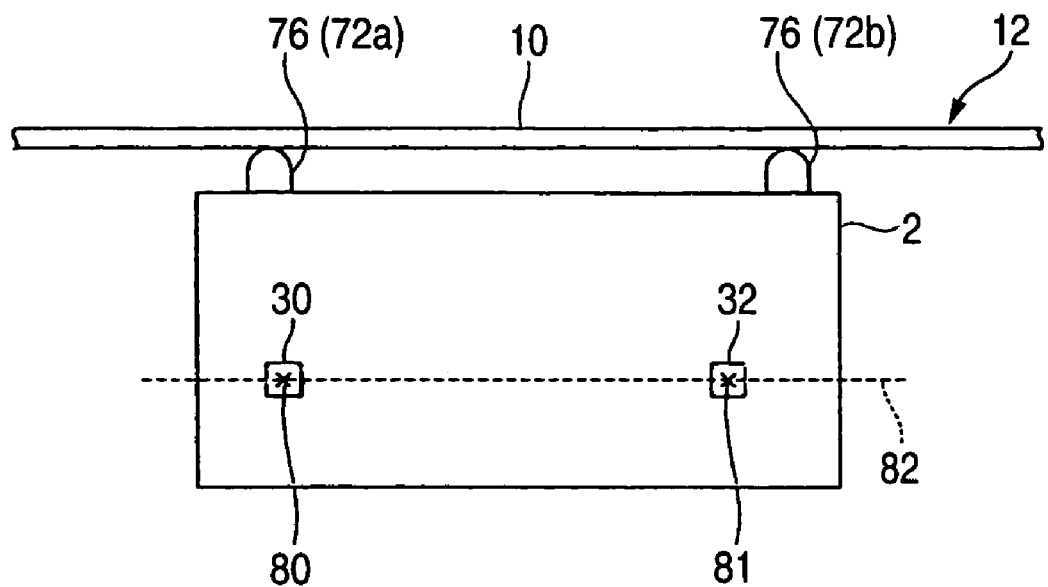
FIGS. 9A and 9B show schematic views of the contact image sensor module according to the first embodiment of the invention.
Figure 9B:
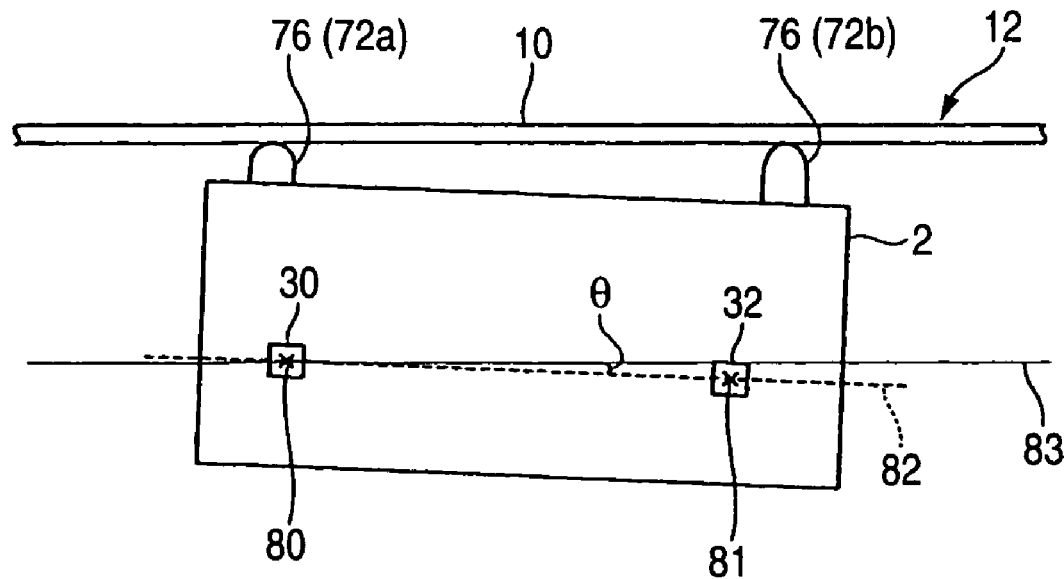

FIGS. 9A and 9B are schematic views of the contact image sensor module 2 as seen from the direction of an axis 80 of the first linear image sensor 30. Here, suppose that the axis 80 of the first linear image sensor 30 refers to a virtual straight line that is parallel to the longitudinal direction of the first linear image sensor 30 and that passes through the center of the first linear image sensor 30 in a direction parallel to the document platen 10 and through the center thereof in a direction perpendicular to the document platen 10. The same applies to an axis 81 of the second linear image sensor 32. Suppose that the state shown in FIG. 9A is the state in which the standard spacers 72 are used. And, suppose that, in the state shown in FIG. 9A, the optical image of the document is clearly focused onto the first linear image sensor 30, while an out-of-focus or so-called blurred optical image is focused onto the second linear image sensor 32 due to an error. In this case, as shown in FIG. 9B, an adjustment can be made so as to bring the optical image to a focus by replacing the second spacer 72*b* with a different one having the projection 76 of a different height. A clear optical image is thereby focused both on the first and second linear image sensors 30 and 32. As the second spacer 72*b* is thus replaced with a different one having the projection 76 of a different height, as a result, it follows that the contact image sensor module 2 is adjusted as to an inclination θ about the axis 80 of the first linear image sensor 30, more specifically, an inclination θ of a virtual plane 82, which includes the axis 80 of the first linear image sensor 30 and the axis 81 of the second linear image sensor 32, to a virtual plane 83 parallel to the document platen 10. Additionally, in the first embodiment, the inclination is described based on the axis 80 of the first linear image sensor 30, but the same is true even of the case based on the axis 81 of the second linear image sensor 32. That is, it can also be said in another way that the inclination about the axis 80 of the first linear image sensor 32 is the inclination about the axis 81 of the second linear image sensor 32.

Figure 10:
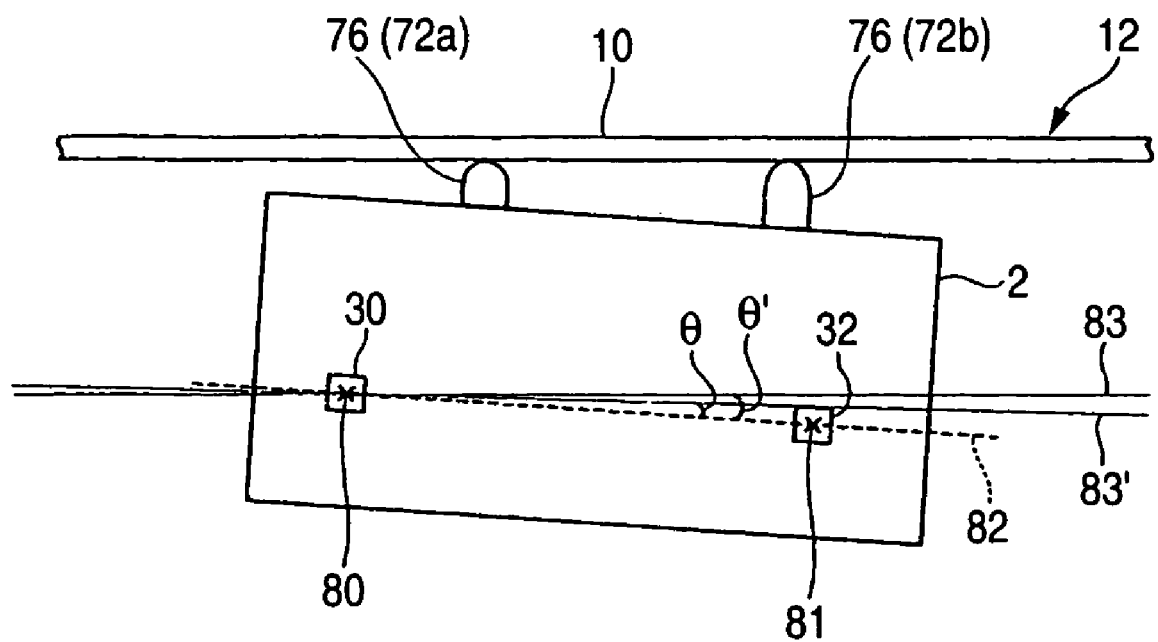
FIG. 10 shows a schematic view of the contact image sensor module according to the first embodiment of the invention.

FIG. 10 is an example in which the distance between the projections is smaller than in the example shown in FIG. 9B. Similar to FIG. 9B, FIG. 10 is also a schematic view of the contact image sensor module 2 as seen from the axis 80 of the first linear image sensor 30. The projections 76 of the first and second spacers 72*a* and 72*b* in the example shown in FIG. 10 are the same in height as those shown in FIG. 9B. In the case where the projections 76 are constant in height, when the distance between the projections 76 is small, an inclination θ' is greater than the inclination θ shown in FIG. 9B. That is, when a change in height of the projections 76 is constant, the larger the distance between the projections 76, the smaller the width of a change in inclination of the contact image sensor module 2. Accordingly, the inclination can be more finely adjusted as the distance between the projections 76 is larger. Since the distance between the projections 76 can be made larger as the width of the contact image sensor module 2 in the sub scanning direction is larger, accordingly, the inclination can be more finely adjusted as the width of the contact image sensor module 2 in the sub scanning direction is larger. Since the width of the contact image sensor module 2 in the sub scanning direction can be increased when the second protruding portion 78 is provided, accordingly, when the second protruding portions 78 are provided so that the projections 76 are positioned just thereabove, it follows that the inclination can be more finely adjusted.

Another example of the adjustment will now be described.

Figure 11A:
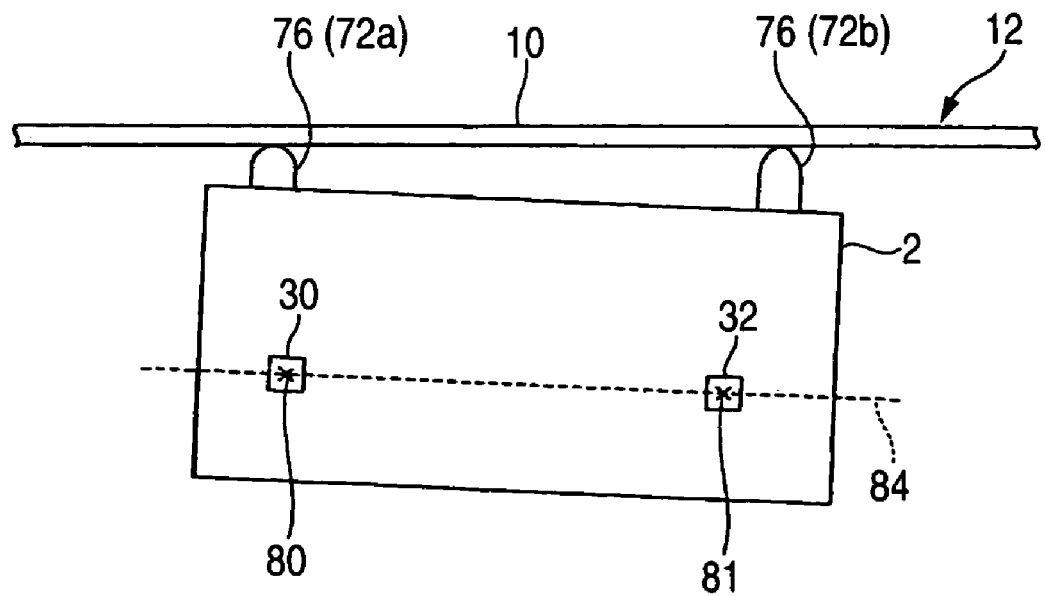
FIGS. 11A and 11B show schematic views of the contact image sensor module according to the first embodiment of the invention.
Figure 11B:
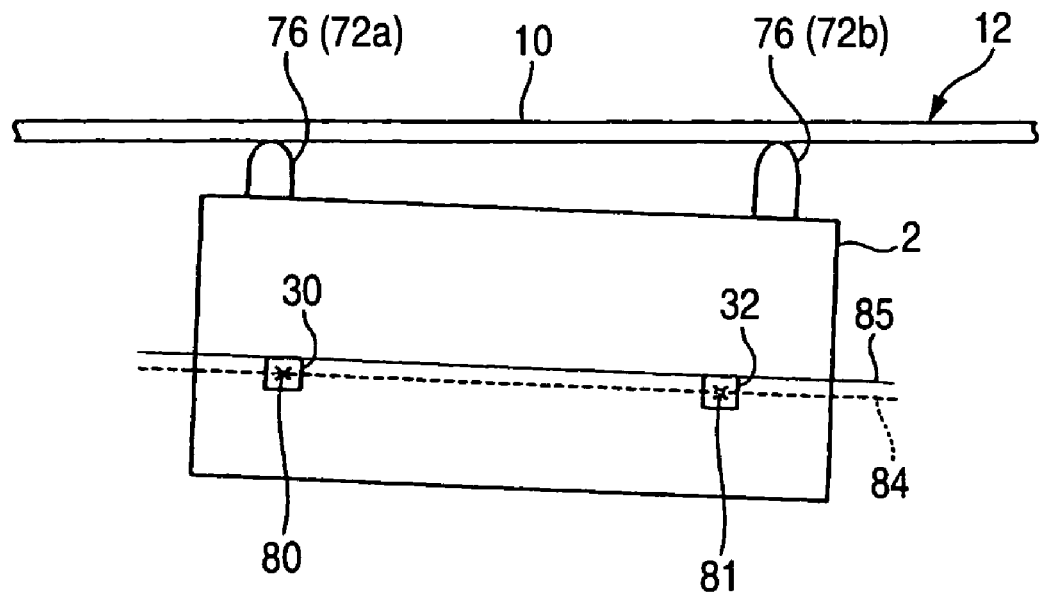

FIGS. 11A and 11B are schematic views of the contact image sensor module 2 as seen from the axial direction of the first linear image sensor 30. Suppose that the state shown in FIG. 11A is the state in which the standard spacers 72 are used. And, suppose that, in the state shown in FIG. 11A, an out-of-focus optical image is focused both onto the first and second linear image sensors 30 and 32. In this case, as shown in FIG. 11B, the first and second spacers 72*a* and 72*b* are replaced with respective different ones from the standard so that a clear optical image is focused both onto the first and second linear image sensors 30 and 32. In this case, suppose that both the first and second spacers 72*a* and 72*b* are replaced with spacers of +0.1 mm relative to the standard. Then, it follows that a virtual plane 84, which includes the axis 80 of the first linear image sensor 30 and the axis 81 of the second linear image sensor 32, remains constant in inclination, and that only a position in a direction perpendicular to the platen surface 12 of the document platen 10 is adjusted. Here, a virtual straight line 85 shown in FIG. 11B indicates the virtual plate 84 before its position is adjusted. That is, when the first and second spacers 72a and 72b are equal in height change to each other, it follows that only the position in a direction perpendicular to the document platen 10 is adjusted.

The above is one example of the adjustment, and in the same manner, the first and second spacers 72a and 72b are appropriately combined together to adjust the inclination and position, whereby an adjustment can be made so that a clear image is focused both onto the first and second linear image sensors 30 and 32.

Support members for supporting the document platen 10 will now be described.

Figure 12:
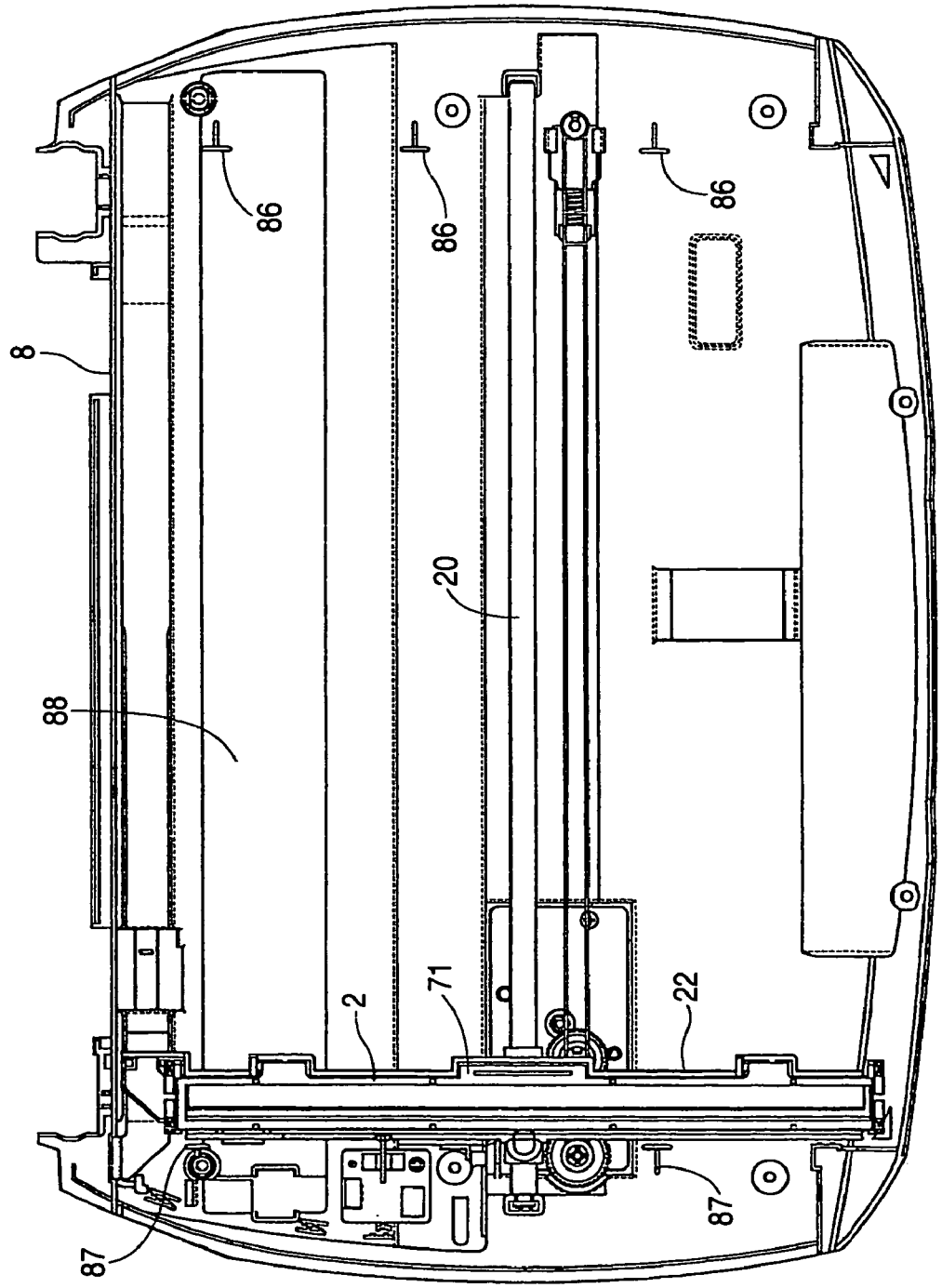
FIG. 12 shows a top view of the image reading apparatus according to the first embodiment of the invention.
Figure 13:
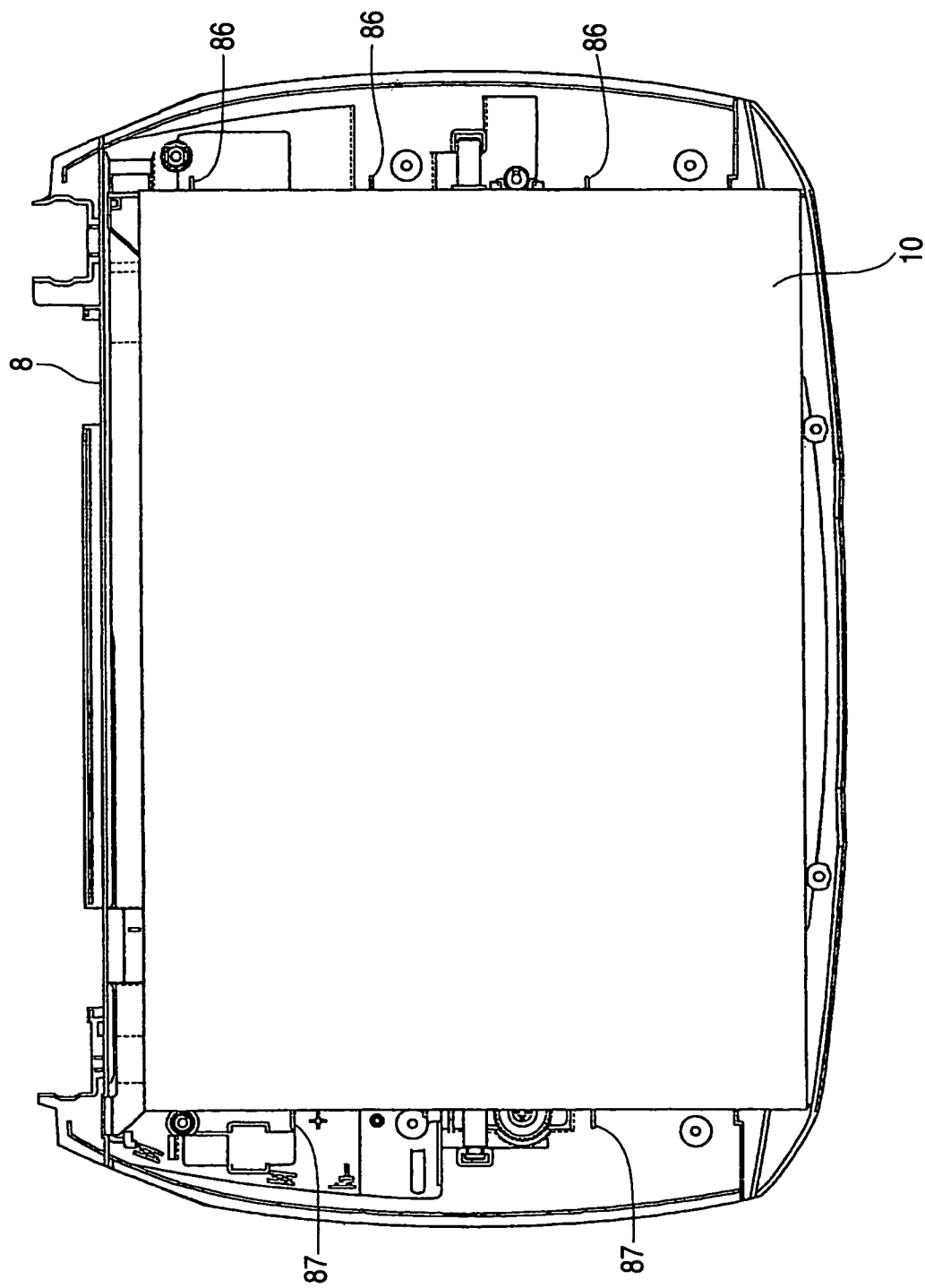
FIG. 13 shows a top view of the image reading apparatus according to the first embodiment of the invention.

FIG. 12 is a top view of the inside of the image scanner 1, and FIG. 13 is a top view showing the state in which supports serving as the support members support the document platen 10. Supports 86 project, in a T shape, upward from a bottom wall 88 of the housing 8, and support one end portion of the document platen 10 in the sub scanning direction. Supports 87 also project, in a T shape, upward from the bottom wall 88, and support the other end portion of the document platen 10 in the sub scanning direction. The document platen 10 is thereby supported as shown in FIG. 13.

Figure 1:
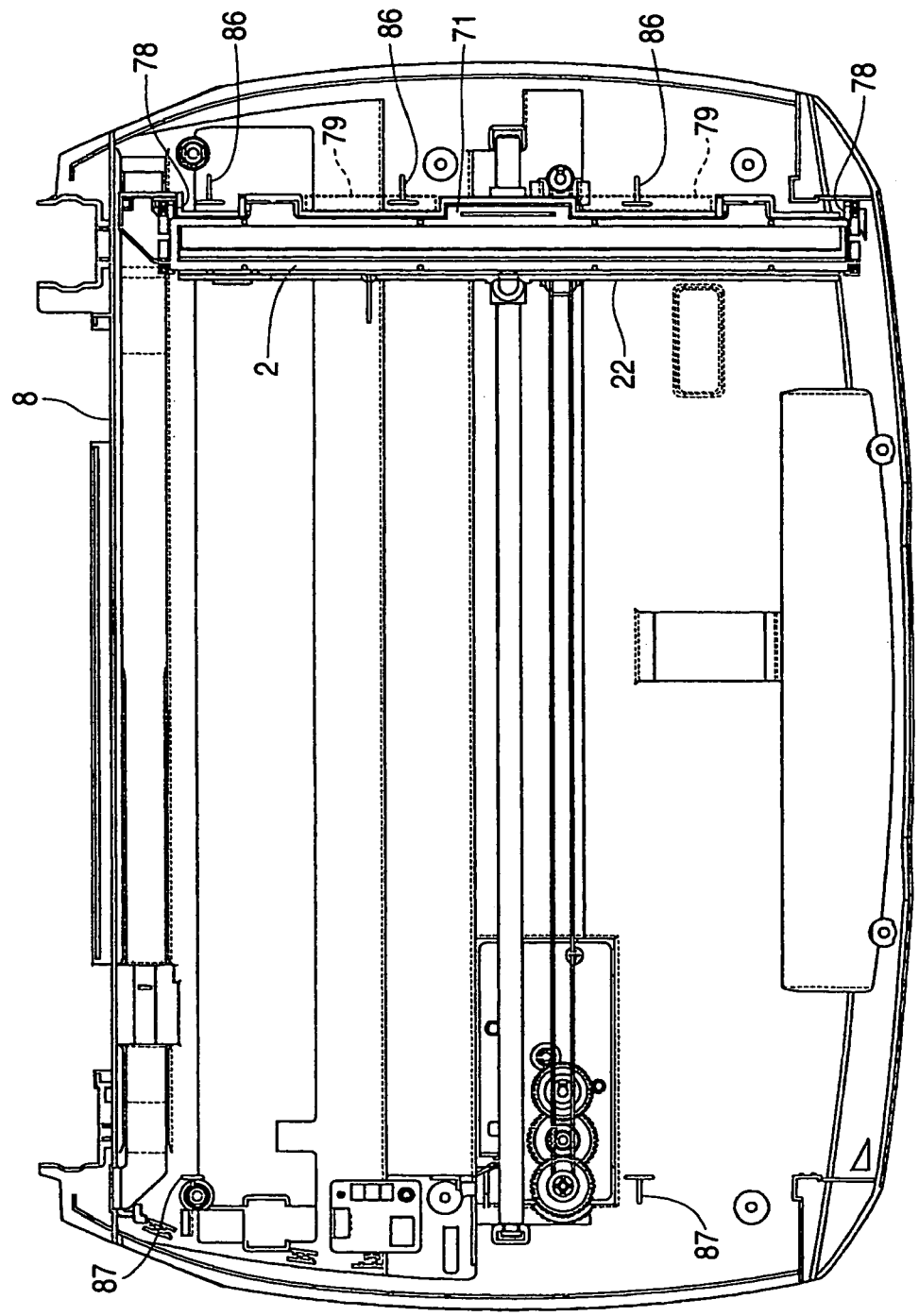
FIG. 1 shows a top view of the image reading apparatus according to a first embodiment of the invention.
Figure 2:
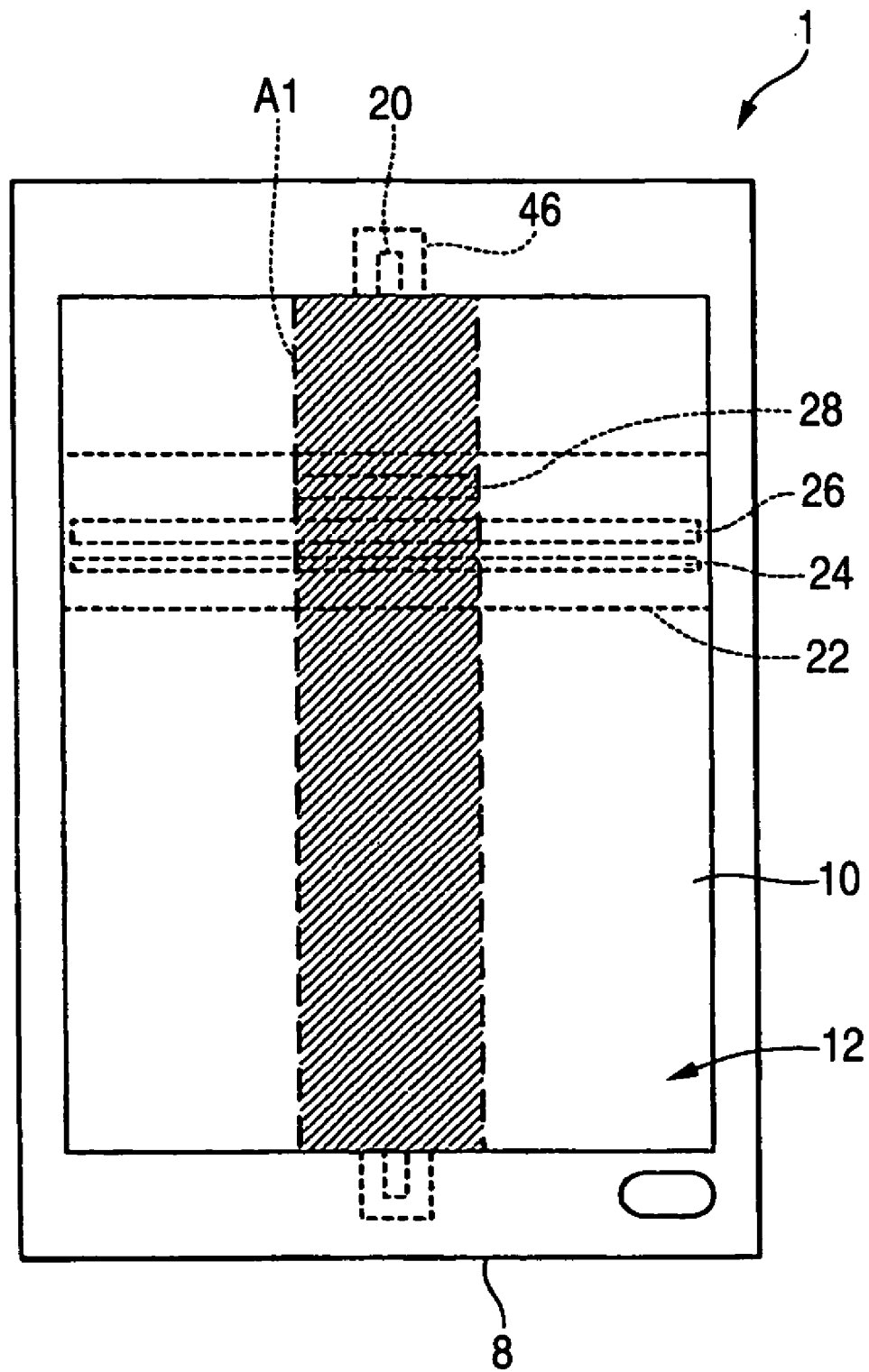
FIG. 2 shows a schematic view of an image reading apparatus according to the first embodiment of the invention.

FIG. 1 shows the state in which the carriage 22 is moved to one sub scanning-direction end. As shown in the figure, the first protruding portion 71 and the supports 86 are not overlapped in main scanning direction position with each other, and part of the supports 86 are housed into a space 79 that is present on a side of the first protruding portion 71 in the main scanning direction. The space 79 is also a space that is present on a side of the second protruding portion 78 in the main scanning direction.

According to the above-described image scanner 1 of the first embodiment of the invention, since the second linear image sensor 32 is shorter in length than the first linear image sensor, the first protruding portion 71 protruding in the sub scanning direction is provided, and the second linear image sensor 32 is housed into the first protruding portion 71, thereby securing a space on a side of the second linear image sensor 32 in the main scanning direction. The space on the side of the second linear image sensor 32 in the main scanning direction, in other words, is the space 79 that is present on the side of the contact image sensor module 2 in the main scanning direction. When the contact image sensor module 2 is transported to the sub scanning-direction end, the supports 86 are housed into the space 79 that is present on a side of the first protruding portion 71 in the main scanning direction, without abutting the first protruding portion 71. Accordingly, the supports 86 need not be displaced in the sub scanning direction although the contact image sensor module 2 is increased in size in the sub scanning direction by housing thereinto the two linear image sensors. This can avoid an increase in size of the document platen 10 in the sub scanning direction. Therefore, according to the image scanner 1, the two linear image sensors can be mounted on the contact image sensor module 2 without increasing the size of the document platen 10.

Besides, the support 86 does not abut the second protruding portion 78, either, so that the support 86 need not be displaced in the sub scanning direction although the second protruding portion 78 is provided in order that the inclination θ of the contact image sensor module 2 can be finely adjusted. This can avoid an increase in size of the document platen 10 in the sub scanning direction.

Additionally, in the first embodiment, the supports 86 are described as an example of the support members, but the support members may be, for example, L-shaped hooks provided on an upper wall of the housing 8. Even when the support members are the hooks, the hooks are adapted to be housed into the space 79 that is present on the side of the first protruding portion 71 in the main scanning direction, which can avoid an increase in size of the document platen in the sub scanning direction.

Besides, in the first embodiment, the first protruding portion 71 is provided so as to protrude toward the right side of the plane of FIG. 1. However, the configuration may be such that the first protruding portion 71 is provided so as to protrude toward the left side of the plane of FIG. 1, and such that the supports 87 are housed into a space that is present on a side of the first protruding portion in the main scanning direction.

Second Embodiment

Figure 14:
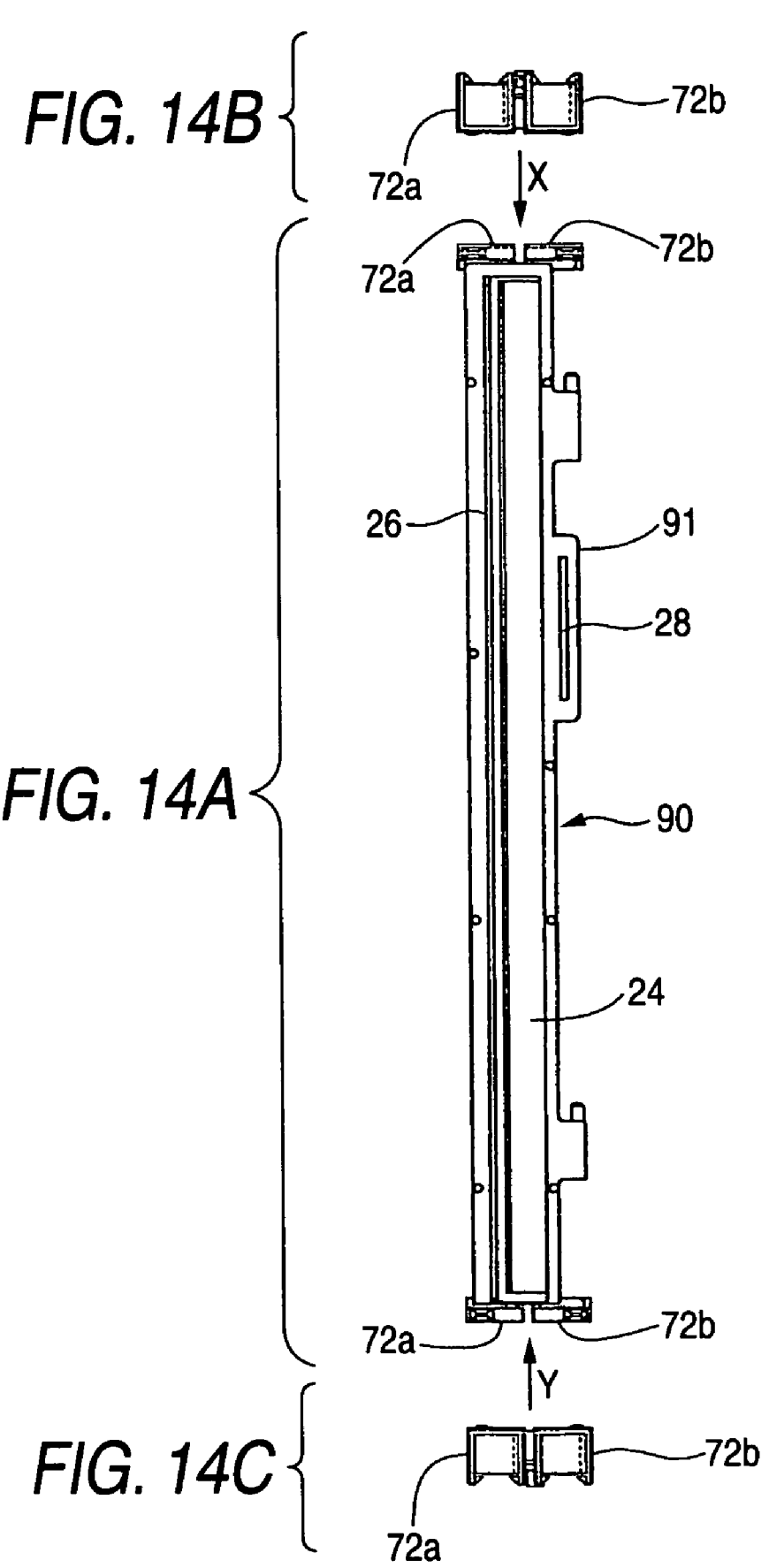
FIG. 14A shows a top view of a contact image sensor module according to a second embodiment of the invention.
FIGS. 14B and 14C show side views thereof.

FIG. 14A is a top view of a contact image sensor module 90 of a second embodiment, and FIGS. 14B and 14C are side views of the contact image sensor module 90 as seen from the directions X and Y, respectively, shown in FIG. 14A. In the second embodiment as well, a second linear image sensor 32 is housed in a first protruding portion 91 of a casing 99, and a first linear image sensor 30 is housed in a portion other than the first protruding portion 91. As shown in the figure, in the second embodiment, the first protruding portion 91 is provided not at a main scanning-direction center, but at a position offset from the center. The position of the supports 86 is taken up in the vicinity of the center of the contact image sensor module 90 in the main scanning direction, the first protruding portion 91 is displaced as shown in the figure, whereby the supports 86 can be prevented from abutting the first protruding portion 91. The first protruding portion 91 may be provided thus appropriately displaced in the main scanning direction in response to the position of the supports 86.

Third Embodiment

Figure 15:
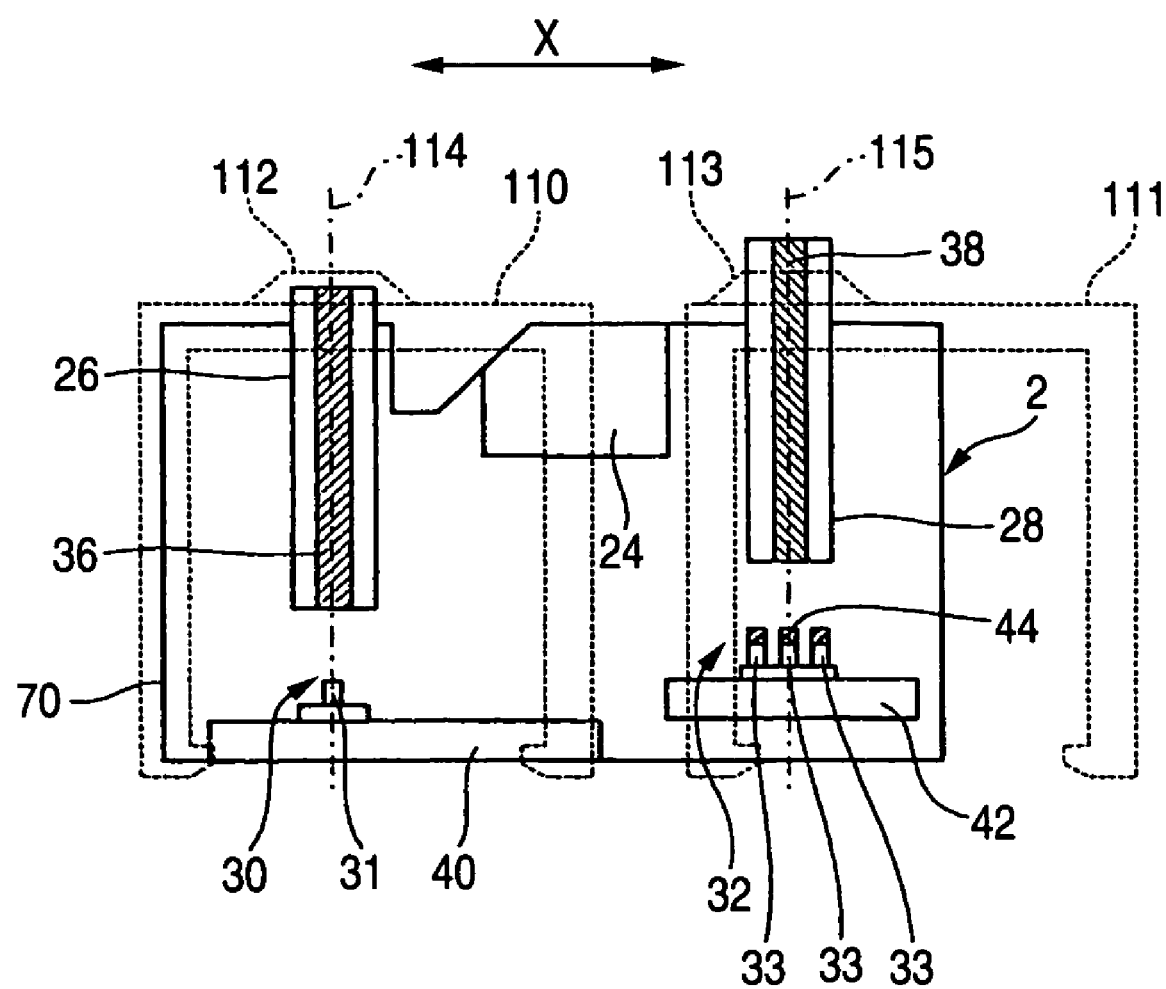
FIG. 15 shows a schematic view of a contact image sensor module according to a third embodiment of the invention.

FIG. 15 is a schematic view of a contact image sensor module 2 of a fifth embodiment. FIG. 15 is a schematic view thereof as seen from the longitudinal direction of a first linear image sensor 30 and, at the same time, a schematic view thereof as seen from the longitudinal direction of a second linear image sensor 32. Here, the direction X in the figure indicates the sub scanning direction. A spacer of the fifth embodiment is divided into a first spacer 110 and a second spacer 111. When the contact image sensor module 2 is seen from the longitudinal direction of the first linear image sensor 30, as shown in the figure, a projection 112 of the first spacer 110 is provided so as to be positioned on a centerline 114 of rod lenses 36. When the projection 112 is positioned on the centerline 114 of the rod lenses 36, the height of the projection 112 can also be made equal to the distance between the rod lenses 36 and the document platen 10. Consequently, when the distance between the rod lenses 36 and the document platen 10 is intended to be adjusted to an intended distance, the spacer 110 is replaced with a spacer the height of the projection 112 of which is equal to the aforesaid distance, whereby the aforesaid distance can be adjusted to the intended distance. That is, it becomes easy to adjust the distance between the rod lenses 36 and the document platen 10 to the intended distance. The same applies to a projection 113, and the projection 113 is provided so as to be positioned on a centerline 115 of rod lenses 38.

What is claimed is:

1. An image reading apparatus comprising:
   a document platen;
   a support member supporting an end portion of the document platen from below in a sub scanning direction;

a sensor module having a first protruding portion protruding in the sub scanning direction, the sensor module comprising:
   a first sensor; and
   a second sensor being shorter than the first sensor in length and being housed into the first protruding portion; and
a transport unit transporting the sensor module in the sub scanning direction,
wherein when the sensor module is transported to an end part in the sub scanning direction, the support member is housed into a space disposed at a side of the first protruding portion in a main scanning direction.

2. The image reading apparatus according to claim 1, wherein
   a first pixel size of the first sensor is different from a second pixel size of the second sensor.

3. The image reading apparatus according to claim 1, further comprising:
   a first lens focusing onto the first sensor an optical image of the document supported by the document platen on a platen surface of the document platen; and
   a second lens focusing onto the second sensor the optical image of the document that is supported by the document platen at a position away from the platen surface.

4. The image reading apparatus according to claim 3, further comprising:
   a spacer that adjusts inclination about an axis of the first sensor and is replaceably disposed between the sensor module and the document platen; and
   an urging member urging the sensor module toward the document platen, wherein
   the spacer has two projections spaced from each other in the sub scanning direction, the projections project toward the document platen, and
   one of the projections is positioned on a centerline of the first lens in the main scanning direction.

5. The image reading apparatus according to claim 4, wherein
   the other projection is positioned on a centerline of the second lens in the main scanning direction.

6. The image reading apparatus according to claim 1, further comprising
   an adjustment member that adjusts inclination of the sensor module to the document platen.

7. The image reading apparatus according to claim 6, further comprising
   an urging member urging the sensor module toward the document platen, wherein
   the adjustment member includes a spacer replaceably disposed between the sensor module and the document platen.

8. The image reading apparatus according to claim 7, wherein
   the spacer has two projections spaced from each other in the sub scanning direction, and
   the projections project toward the document platen.

9. The image reading apparatus according to claim 8, wherein
   the spacer is divided into a first spacer having one of the projections and a second spacer having the other projection.

10. The image reading apparatus according to claim 9, wherein
    the one of the projections is provided at a center of the first spacer in the sub scanning direction, and
    the other projection is provided at a center of the second spacer in the sub scanning direction.

11. The image reading apparatus according to claim 8, wherein
    the sensor module has a second protruding portion protruding in the sub scanning direction,
    one of the projections is attached to the second protruding portion, and
    when the sensor module is transported to an end part in the sub scanning direction, the support member is housed into a space disposed at a side of the second protruding portion in the main scanning direction.

* * * * *